United States Patent [19]

Burleigh

[11] 3,964,798
[45] June 22, 1976

[54] SAFETY BELT ANCHORAGES
[75] Inventor: David William Burleigh, Yateley, England
[73] Assignee: Britax (London) Limited, Byfleet, England
[22] Filed: Feb. 7, 1975
[21] Appl. No.: 548,031

[30] Foreign Application Priority Data
Feb. 14, 1974 United Kingdom............... 6695/74

[52] U.S. Cl................................ 303/1 A; 280/744
[51] Int. Cl.² ........................................ F16C 29/02
[58] Field of Search ................... 308/1 R, 1 A, 3 R;
280/150 SB; 105/464, 475, 478, 482, 502;
248/40 B, 242, 243, 423

[56] References Cited
UNITED STATES PATENTS

| 2,736,272 | 2/1956 | Elsner............................ 105/482 |
| 2,880,788 | 4/1959 | Phillips et al................. 280/150 SB |
| 3,366,996 | 2/1968 | Springer......................... 105/475 X |
| 3,618,975 | 11/1971 | Bombach...................... 280/150 SB |
| 3,746,393 | 7/1973 | Andres et al.............. 280/150 SB X |

Primary Examiner—Kenneth H. Betts
Assistant Examiner—Gene A. Church
Attorney, Agent, or Firm—Baldwin, Wight & Brown

[57] ABSTRACT

An anchorage member for adjusting the position of a safety belt with regard to body shape and seat position. The anchorage member is attached to a door pillar or alongside a seat and comprises a slide member for selectively engaging a series of abutments. The slide member is biased into engagement with the abutments and may be locked in position.

15 Claims, 4 Drawing Figures

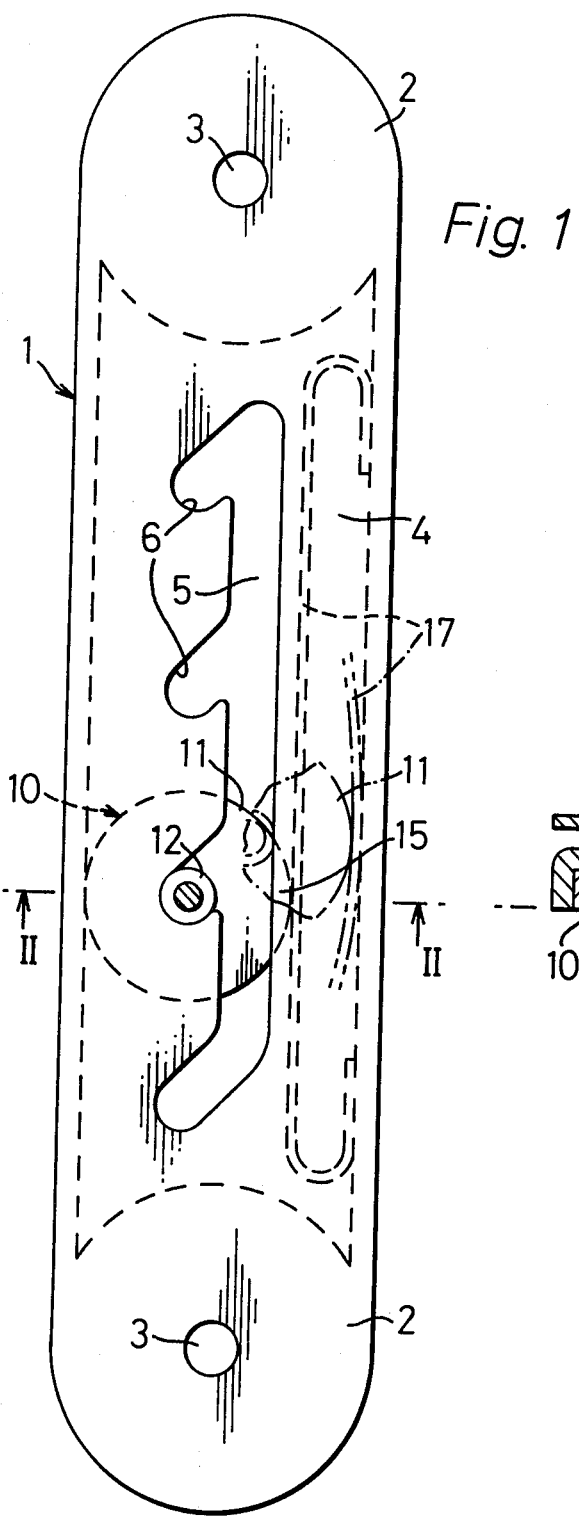
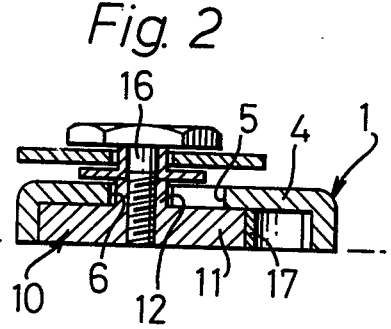

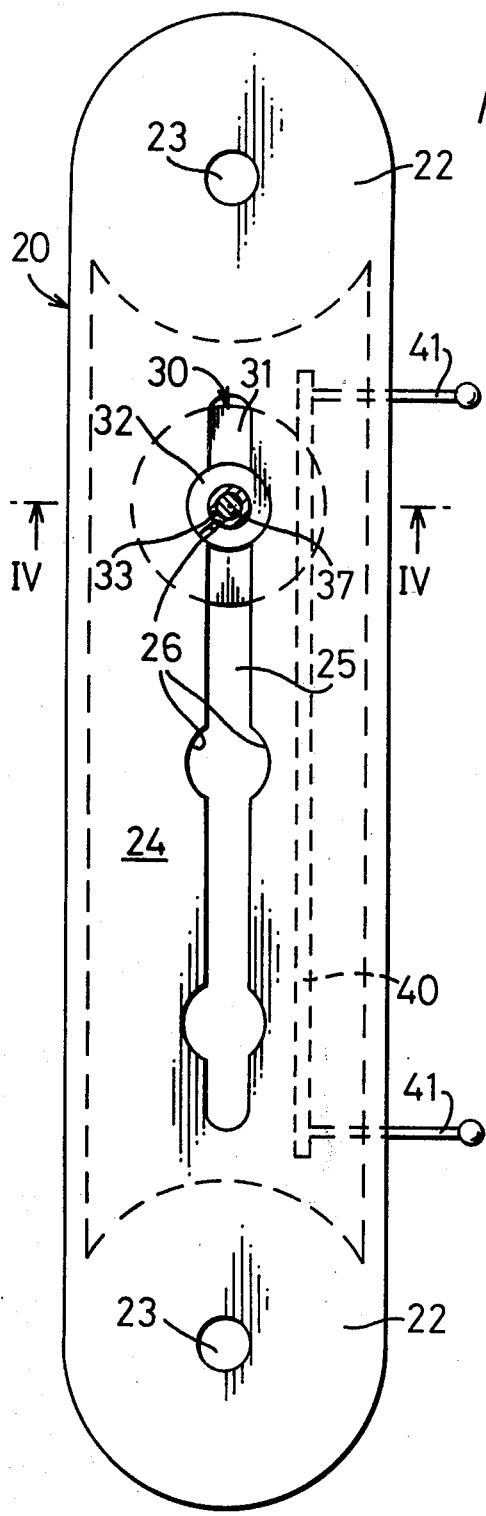
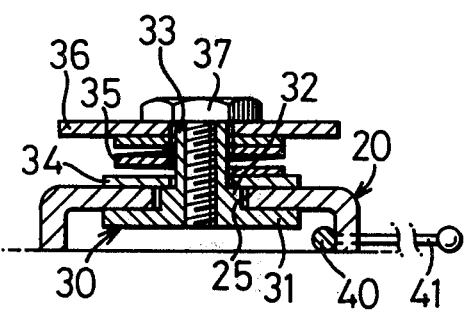
Fig. 3
Fig. 4

SAFETY BELT ANCHORAGES

This invention relates to an anchorage for a safety belt to restrain a passenger in the seat of a vehicle.

With safety belts as commonly known and used at the present time, there is generally a belt length arranged to extend diagonally across the chest of the passenger and also a belt length arranged to extend across the lap of the passenger. The chest belt is anchored at its upper end to the door pillar of the vehicle. From the point of view of passenger comfort, one of the problems is the height of the door pillar anchorage point relative to the vehicle seat and to the shoulders of the passenger, which shoulder height will vary from one passenger to another.

The present invention seeks to overcome this problem and to provide an easily adjustable system whereby the anchorage point, of the chest belt, to the door pillar may be moved, at will, by the passenger.

According to the present invention, an anchorage member for a safety belt comprises an elongated load bearing support having a series of abutment means along its length, a slide member mounted on said support for anchoring a safety belt, the slide member being manually movable for selective engagement with said abutment means, and biasing means serving to maintain the slide member in engagement with the selected abutment means.

The elongated load bearing support is preferably formed with a slot with zones of increased width at two or more spaced locations along its length, the slide member having a base on the reverse side of the support, the base of the slide member having a width greater than the width of the slot and the slide member being manually movable along the slot for selctive engagement with the zones of increased width. A stem or a portion of a safety belt buckle or safety belt attachment member is preferably attached to the base, the stem or said portion projecting through the slot to the front side of the support to provide belt anchorage. The stem or said portion may be adapted for said selective engagement with said zones of increased width. In one embodiment, the zones of increased width comprise notches spaced along one side of the slot, spring means biasing the slide member towards the notched side of the slot. In another embodiment, the zones of increased width comprise pairs of opposed cutouts, the cutouts being of like profile and dimension, In this case, the slide member may have a stem with a base having a projecting shoulder adjacent thereto, which shoulder is dimensioned and shaped to fit each pair of opposed cutouts but not into the slot, spring means being provided to bias the slide member to maintain it in position with the shoulder received in an opposed pair of cut-outs.

Embodiments of the present invention will now be described, by way of example, with reference to the accompanying schematic drawings, in which:

FIG. 1 shows a front elevation of one embodiment of safety belt anchorage,

FIG. 2 shows a cross-section along the line II—II of FIG. 1,

FIG. 3 is a front elevation of a second embodiment of safety belt anchorage, and FIG. 4 is a cross-section along the line IV—IV of FIG. 3.

Referring to FIGS. 1 and 2, the anchorage comprises an elongated support member 1 of channel section with circular flattened ends 2 in which apertures 3 are formed to receive the fixing bolts. A slot 5 is formed in a web portion 4 of the channel support 1. A plurality of spaced notches 6 extend from one side edge of the slot 5. As can be seen in FIG. 1 these notches are inclined so as to extend in the general direction of a chest belt when the support 1 is mounted in a substantially vertical position on the door pillar of a vehicle.

A slide member 10 is accommodate within the channel of the support 1. This slide member has a base 11 lying on the reverse side of the support member 1 and a stem 12 projecting into the slot. The base 11 has a diameter of such dimension that when the slide member 10 is in a selected position with its stem 12 received and engaged in one of the notches 6, the peripheral edge of the base 11 still engages under the edge of the slot as indicated at 15.

Also forming part of the stem 12 is a bolt 16 and to the protruding head of this bolt there is fixed one end of the chest belt of a safety harness.

The slide member 10 is biased to the left as seen in FIG. 1 by a spring 17, whatever the position of the slide member 10 along the length of the slot 5.

In use, the support member 1 is fixed in a substantially vertical position to the door pillar of a motor vehicle. By adjusting the position of the slide member 10 along the length of the slot 5, so the height of the anchorage point of the end of the chest belt may be varied. Adjustment of the position of the slide member 10 is achieved by moving the slide member manually to the right, as seen in FIG. 1, against the bias of the spring 17 and then sliding it up or down the slot 5 to bring it into position of alignment of a notch 6. The slide member 10 is then moved to the left under the bias of the spring 17 so that its stem 12 engages with the selected notch 6.

Referring now to FIGS. 3 and 4, the safety belt anchorage shown therein comprises a load bearing support 20, also of inverted channel section with flattened ends 22 and bolts holes 23. A slot 25 is formed in the web 24 of the channel and opposed pairs of cut-outs 26 are spaced along the slot 25. These cut-outs 26 are of arcuate shape and all of the same radius.

A slide member 30 is provided having a base 31 of a radius greater than that of the cut-outs 26. Thus the peripheral edges, of the base 31 always lie underneath or behind the edges defining the slot 25. The slide 30 has a stem 33 protruding through the slot 25 and this stem has a diameter not greater than the width of the slot 25. An annular shoulder 32 is formed at the base of the stem 33 and has a diameter greater than the width of the slot 25 but not greater than the diameter of the opposed pairs of arcuate cut-outs 26. A spacer washer 34 sits on the shoulder 32 and a compression spring 35, surrounding the stem 33 is sandwiched between the spacer washer 34 and a belt anchorage plate 36. The belt anchorage plate 36 is attached to the stem 31 by a bolt 37.

It will be appreciated that the compression spring 35 tends to lift the slide member 30, as seen in FIG. 4, so that if the shoulder 32 is in engagement with a pair of cut-outs 26 it will be biased and retained in that position. To adjust the position of the slide member 30 and to move it from engagement with one pair of cut-outs 26 to another pair of cut-outs, then the slide member is manually pressed down against the bias of the spring 35 to bring the shoulder 32 below the plain of the web 24. The slide member 30 may then be moved along the slot and when it is in alignment with another pair of cut-outs 26 it will move under the bias of the spring 35 to bring the shoulder 32 into engagement with those cut-outs.

To provide for positive locking of the slide member in a selected position with its shoulder engaged with a pair of opposed cut-outs 26, a locking bar 40 is provided. This locking bar extends along the length of the support member 20 with two protruding ends 41. With the locking bar 40 in the position shown in FIG. 4, the slide ember 30 may be moved down against the bias of the spring 35 but if the locking bar is pushed to the left, as shown in FIGS. 3 and 4, it will then lie underneath the slide member 30 and prevent it from being moved down against the bias of the spring 35.

The anchorage shown in FIGS. 3 and 4 is mounted, in like manner as the anchorage shown in FIGS. 1 and 2, namely in a substantially vertical position on the door pillar of a motor vehicle. The position of the slide member 30 and hence the vertical height of the anchorage chest belt is adjusted by first of all moving the locking bar 40 from beneath the slide member 30, depressing the slide member against the bias of the spring 35 so that its shoulder is moved behind the plane of the web 24 and then sliding the slide 30 along the slot to a selected position of adjustment in alignment with another pair of cut-outs 26.

The bearing support of the anchorage of the present invention may be made for single-bolt attachment to a vehicle door pillar. In this case, the single bolt fitting can be of a type to prevent forward rotation of the bearing support relative to the door pillar, for example, by providing a member on the support which hooks behind the door pillar, or a projection on the support which fits a corresponding recess in the door pillar, or a rectangular aperture to receive a correspondingly shaped portion of a bolt.

The advantage of an anchorage in accordance with the present invention is that the vertical positioning of the top end of the chest belt may be adjusted to suit the comfort of a passenger, without in any way detracting from the full strength requirement of the anchorage. Moreover, it will be appreciated that the anchorage could be fitted adjacent a vehicle seat is selective positioning of the "lap-portion" of a safety belt were required.

What we claim is:

1. An anchorage member for a safety belt, said anchorage member comprising an elongated load bearing support having a series of abutment means along its length, a slide member mounted on said support for anchoring a safety belt, said slide member being manually movable for selective engagement with said abutment means, and biasing means serving to maintain the slide member in engagement with the selected abutment means, said elongated load bearing support being formed with a slot with zones of increased width at at least two spaced locations along its length, said slide member having a width greater than the width of said slot, and said slide member being manually movable along said slot for selective engagement with said zones of increased width, said zones of increased width being in the form of notches spaced along one side of said slot; and said biasing means being spring means biasing the slide member towards the notched side of the slot.

2. An anchorage member according to claim 1 in which a stem attached to said base projects through the slot and is provided for said selective engagement with said notches.

3. An anchorage member according to claim 2 in which said base is dimensioned such that, when the stem engages one of the notches, the peripheral edge of said base engages a portion of said elongated load bearing support.

4. An anchorage member according to claim 3 in which the elongated load bearing support comprises longitudinal edges or wall portions which define an elongate recess, which recess is coextensive with said slot, the biasing means including a leaf spring extending along one of said edges or wall portions, said base being located between the leaf spring and the other one of said edges or wall portions.

5. An anchorage member according to claim 1 in which the longitudinal dimension of each notch is inclined with respect to the longitudinal dimension of said slot.

6. An anchorage member for a safety belt, said anchorage member comprising an elongated load bearing support having a series of abutment means along its length, a slide member mounted on said support for anchoring a safety belt, said slide member manually movable for selective engagement with said abutment means, and biasing means serving to maintain the slide member in engagement with the selected abutment means, said elongated load bearing support being formed with a slot with zones of increased width at at least two spaced locations along its length, said slide member having a base on a reverse side of said support, said base of said slide member having a width greater than the width of said slot, and said slide member being manually movable along said slot for selective engagement with said zones of increased width, said zones of increased width comprising pairs of opposed cut-outs, said cut-outs being of like profile and dimension, a member extending from said base for providing belt anchorage, said base being engaged with said support surrounding said opposed cut-outs, said member being a stem which extends from a projecting shoulder on said base, said shoulder being dimensioned and shaped to fit each pair of opposed cut-outs but not into said slot per se, spring means for biasing said slide member to maintain it in position with said shoulder received in an opposed pair of said cut-outs, and a locking bar extending along the length of said elongated load bearing support for movement between a first position wherein said base can be moved against the resistance of said spring means to enable said selective positioning of said slide member and a second position wherein said locking bar prevents said movement of said base.

7. An anchorage member according to claim 6 in which the elongated load bearing support inludes edges or wall portions defining an elongated recess, one of said edges or wall portions locating means fixed to said bar for causing said bar to move between said first and second positions.

8. An anchorage member for a safety belt, said anchorage member comprising an elongated load bearing support, said support being formed with a slot with notches spaced along one longitudinal side thereof; a slide member mounted on said support for anchoring a safety belt, said slide member having a base on a reverse side of said support, said base having a width greater than the width of said slot and said slide member being manually movable along said slot for selective engagement with said notches; and biasing means urging said slide member transversely of said slot towards said notched side of said slot.

9. An anchorage member according to claim 8 in which said slide member includes a stem attached to said base projects through said slot and is provided for selective engagement with said notches.

10. An anchorage member according to claim 9 in which said base is dimensioned such that, when said stem is engaged in one of said notches, the peripheral edge of said base engages a portion of said elongated load bearing support.

11. An anchorage member according to claim 10 in which said elongated load bearing support includes longitudinal wall portions which define an elongated recess, said recess being coextensive with said slot; said biasing means including a leaf spring extending along one of said wall portions, said base being located between said leaf spring and the other one of said wall portions.

12. An anchorage member according to claim 11 in which each of said notches is elongate, the longitudinal dimension of each of said notches being inclined with respect to the longitudinal dimension of said slot.

13. An anchorage member for a safety belt, said anchorage member comprising an elongated load bearing support, said support being formed with a slot with pairs of opposed cut-outs along its length, said cut-outs being of like profile and dimension; a slide member mounted on said support for anchoring a safety belt, said slide member having a base on a reverse side of said support, said base having a shoulder dimensioned and shaped to fit respective pairs of said opposed cut-outs but not to fit into said slot per se, a stem extending from said shoulder for providing belt anchorage; and biasing means urging said slide member to a position in which said shoulder is maintained in an opposed pair of said cut-outs.

14. An anchorage member according to claim 13 including a locking bar which extends along the length of said elongated load bearing support and is adapted for movement between a first position wherein said base can be moved against said biasing means to enable selective positioning of said slide member, and a second position wherein said locking bar prevents said movement of said base.

15. An anchorage member according to claim 14 in which said elongated load bearing support includes edges or wall portions defining an elongated recess, one of said edges or wall portions locating means fixed to said bar for causing said bar to move between said first and second positions.

* * * * *